No. 757,045. PATENTED APR. 12, 1904.
A. M. LANE.
PLANT PROTECTOR.
APPLICATION FILED JAN. 25, 1904.
NO MODEL.
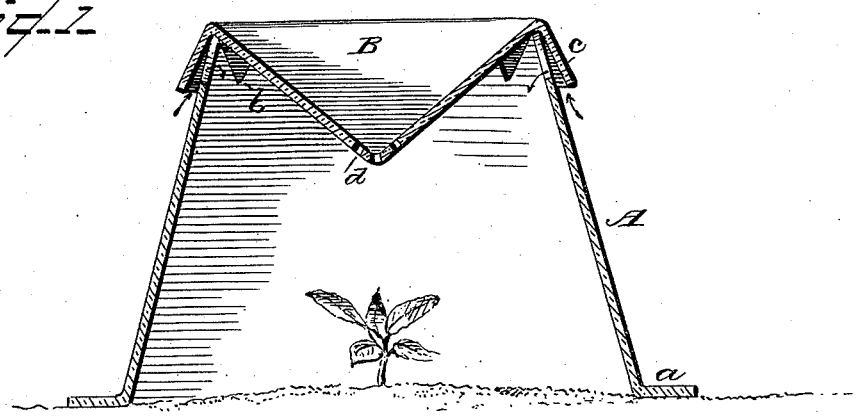
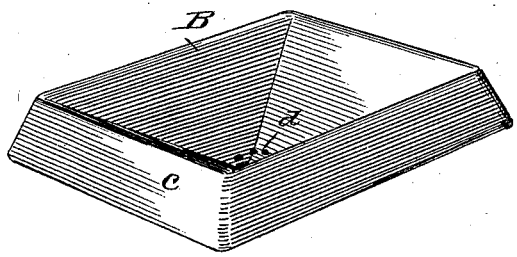
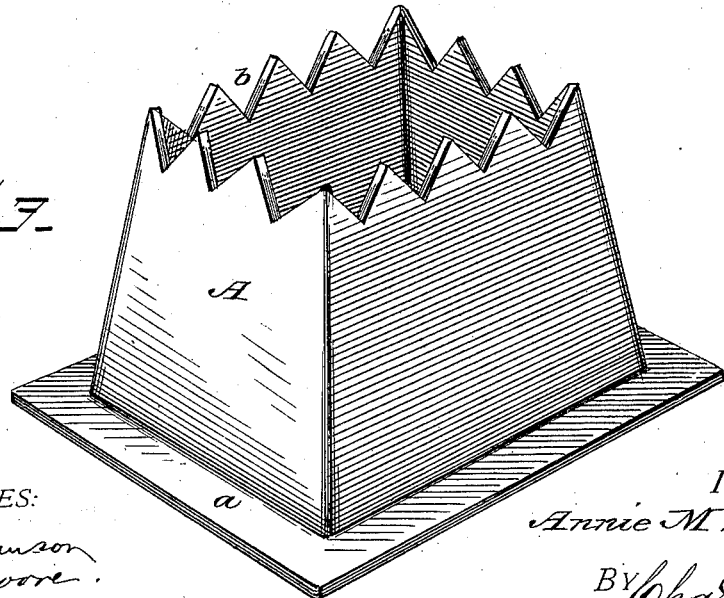
WITNESSES:
C. J. Williamson
M. E. Moore
INVENTOR
Annie M. Lane.
By Chas. H. Fowler
Attorney No. 757,045. Patented April 12, 1904.

UNITED STATES PATENT OFFICE.

ANNIE M. LANE, OF LAKESIDE, CALIFORNIA.

PLANT-PROTECTOR.

SPECIFICATION forming part of Letters Patent No. 757,045, dated April 12, 1904.

Application filed January 25, 1904. Serial No. 190,498. (No model.)

*To all whom it may concern:*

Be it known that I, ANNIE M. LANE, a citizen of the United States, residing at Lakeside, in the county of San Diego and State of California, have invented certain new and useful Improvements in Plant-Protectors; and I do hereby declare that the following is a full, clear, and exact description of the same, reference being had to the annexed drawings, making a part of this specification, and to the letters of reference marked thereon.

The present invention has for its object to provide a simple, inexpensive, and effective device for use in protecting the young plant from the cold and frost and also against the ravages of worms, bugs, and other insects, and a device that can be further used to advantage in placing it around the seed after it has been planted, in order to protect the same from the insects that infest a garden, and also to protect the plant when grown from all animals and birds that would destroy the early vegetation of the plant.

The invention consists in a plant-protector constructed substantially as shown in the drawings, and hereinafter described and claimed.

Figure 1 of the drawings is a sectional elevation of the protector, showing it placed around a plant; Fig. 2, a perspective view of the hood detached from the protector; Fig. 3, a similar view of the protector.

In the accompanying drawings, A represents the body of my improved plant-protector, preferably constructed with flat sides, which are flaring outwardly from the top downward, so as to have a base of increased area. The top edge of the side walls of the body is scalloped, as shown at $b$, to allow the passage of the air to the plant, and at the base of the walls is an outwardly-projecting horizontal flange $a$ to prevent the body from sinking into the ground and to form a support therefor when placed around the plant and retain it above the surface of the ground, this being considered important when the earth becomes soft after a rain.

A cone-shaped hood B rests upon the scalloped edge of the body A and has an outwardly-flaring protecting-flange $c$, which extends downwardly slightly below the scalloped edge of the body, and at the apex of the cone-shaped hood are perforations $d$ to let in the air and water sufficient to sustain the plant. As will be noticed, the protecting-flange $c$ flares outward, so that it will not come up close against the scalloped edge of the body and close the openings formed by said scalloped edge, thereby allowing a space for the air to pass up between the flange and the scalloped edge and through the openings thereof into the body in contact with the plant. This gives a perfect ventilation to the plant, and the downward-extending flange $c$ prevents the wind or rain from beating in through the openings formed by the scalloped edge and injuring the growing plant.

Every provision is made for the protection of the growing plant from the weather and from the ravages of worms, bugs, insects, birds, and young animals, the protector letting in warmth and sunlight sufficient to keep the plant in good condition.

Any opening or openings may be substituted for the scalloped edges of the body or any provision made whereby the air can pass into the body at or near the top thereof, and the hood and body of the protector may be made of glass or other suitable material.

When it is desired to obtain access to the plant, the hood may be lifted off without disturbing the body, thereby allowing the plant to be watered or the earth worked around it, as circumstances may require.

Having now fully described my invention, what I claim as new, and desire to secure by Letters Patent, is—

A plant-protector, comprising a suitable body adapted to be placed over the plant and having at its base an outwardly and horizontally extending flange to serve as a wide support for the body to prevent it from sinking into the ground, a plurality of openings at the upper end of the body and through the side wall thereof for the ingress of air, a removable cone-shaped hood having openings at the apex thereof, and a flange extending below the plane of the openings at the top of the body to guard against the rain or wind blowing therethrough, said flange flaring outwardly to provide a space for the air to pass up and through the openings to the interior of the body, substantially as and for the purpose set forth.

In testimony whereof I affix my signature in presence of two witnesses.

ANNIE M. LANE.

Witnesses:
ARTHUR SHEPARD,
JAMES THOMPSON.